(12) United States Patent
Makino

(10) Patent No.: US 9,651,975 B2
(45) Date of Patent: May 16, 2017

(54) SYSTEM, METHOD AND APPARATUS FOR POWER DEMAND ADJUSTMENT BASED ON CONSUMER ANNOYANCE

(71) Applicant: HITACHI, LTD., Tokyo (JP)

(72) Inventor: Yurie Makino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 414 days.

(21) Appl. No.: 14/548,597

(22) Filed: Nov. 20, 2014

(65) Prior Publication Data

US 2015/0234407 A1    Aug. 20, 2015

(30) Foreign Application Priority Data

Feb. 14, 2014   (JP) .................................. 2014-026279

(51) Int. Cl.
| | |
|---|---|
| *G05F 1/66* | (2006.01) |
| *H02J 3/12* | (2006.01) |
| *H02J 13/00* | (2006.01) |
| *H02J 3/00* | (2006.01) |

(52) U.S. Cl.
CPC ................. *G05F 1/66* (2013.01); *H02J 3/12* (2013.01); *H02J 13/0006* (2013.01); *H02J 2003/003* (2013.01); *H02J 2003/007* (2013.01); *Y02B 70/3216* (2013.01); *Y02E 60/76* (2013.01); *Y04S 10/54* (2013.01); *Y04S 20/221* (2013.01); *Y04S 40/22* (2013.01)

(58) Field of Classification Search
None
See application file for complete search history.

(56) References Cited

U.S. PATENT DOCUMENTS

2011/0172837 A1* 7/2011 Forbes, Jr. ............. G06Q 10/00
                                                            700/291

FOREIGN PATENT DOCUMENTS

| JP | 2008-125925 A | 5/2008 |
|---|---|---|
| JP | 2010-256098 A | 11/2010 |

\* cited by examiner

*Primary Examiner* — Mohammad Ali
*Assistant Examiner* — Saad M Kabir
(74) *Attorney, Agent, or Firm* — Mattingly & Malur, PC

(57) ABSTRACT

A processing apparatus predicts a first demand amount and a first supply amount in the plan period, selects a candidate group, which is a candidate of a target of a load control, from among the plurality of devices, sends confirmation information that indicates a confirmation of the load control to a communication destination corresponding to the candidate group, upon receiving refusal information that indicates that the load control is refused, excludes the device corresponding to the refusal information from the candidate group, after the selection of the candidate group, receives second demand information and second supply information, predicts a second demand amount and a second supply amount in the plan period, selects a target group, which is a target of the load control, from among the candidate group, and sends a command to the control apparatus corresponding to the target group.

12 Claims, 10 Drawing Sheets

Fig. 3

Power supply amount information 161

| Date (611) | Day of week (612) | Time slot (613) | Supply amount [wh] (614) |
|---|---|---|---|
| 20130814 | Wed | 9:00-10:00 | 100,000,000 |
| 20130807 | Wed | 9:00-10:00 | 120,000,000 |
| 20130731 | Wed | 9:00-10:00 | 90,000,000 |

Fig. 4

Predicted power supply amount information 162

| Day of week (621) | Time slot (622) | Supply amount [wh] (623) |
|---|---|---|
| Wed | 9:00-10:00 | 100,000,000 |
| Wed | 10:00-11:00 | 110,000,000 |
| Wed | 11:00-12:00 | 115,000,000 |

Fig. 5

Power demand amount information 163

| Date (631) | Day of week (632) | Time slot (633) | Supply amount [wh] (634) |
|---|---|---|---|
| 20130814 | Wed | 9:00-10:00 | 90,000,000 |
| 20130807 | Wed | 9:00-10:00 | 110,000,000 |
| 20130731 | Wed | 9:00-10:00 | 85,000,000 |

Fig. 6

Predicted power demand amount information 164

| Day of week (641) | Time slot (642) | Supply amount [wh] (643) |
|---|---|---|
| Wed | 9:00-10:00 | 90,000,000 |
| Wed | 10:00-11:00 | 105,000,000 |
| Wed | 11:00-12:00 | 75,000,000 |

Fig. 7

Load measurement value information 171

| Consumer ID | Device ID | Date | Day of week | Measurement time | Measurement value [w] |
|---|---|---|---|---|---|
| 001 | 101 | 20130814 | Wed | 9:05 | 0.3 |
| 001 | 101 | 20130807 | Wed | 9:10 | 0.5 |
| 001 | 102 | 20130731 | Wed | 9:08 | 3.0 |

Fig. 8

Reduction amount information 172

| Consumer ID | Device ID | Day of week | Time slot | Reduction amount [w] |
|---|---|---|---|---|
| 001 | 101 | Wed | 9:00-9:30 | 0.4 |
| 001 | 102 | Wed | 9:00-9:30 | 3 |
| 002 | 201 | Wed | 9:00-9:30 | 2 |

Fig. 9

Priority information 173

| Consumer ID | Device ID | Day of week | Time slot | Priority |
|---|---|---|---|---|
| 001 | 101 | Wed | 9:00-10:00 | 5 |
| 001 | 102 | Wed | 9:00-10:00 | 4 |
| 001 | 103 | Wed | 9:00-10:00 | 4 |

Columns: 731, 732, 733, 734, 735

Fig. 10

DLC refusal rate information 174

| Consumer ID | Device ID | Day of week | Time slot | DLC refusal rate | Number of confirmations | Number of refusals |
|---|---|---|---|---|---|---|
| 001 | 101 | Wed | 14:00-14:30 | 0 | 10 | 0 |
| 002 | 201 | Wed | 14:00-14:30 | 0.8 | 2 | 8 |
| 003 | 301 | Wed | 14:00-14:30 | 0.5 | 5 | 5 |

Columns: 741, 742, 743, 744, 745, 746, 747

Fig. 11

Annoyance level information 175

| Consumer ID | Device ID | Day of week | Time slot | Annoyance level | Number of reviews | Number of annoyance responses |
|---|---|---|---|---|---|---|
| 001 | 101 | Wed | 14:00-14:30 | 0 | 10 | 0 |
| 002 | 201 | Wed | 14:00-14:30 | 0.7 | 10 | 7 |
| 003 | 301 | Wed | 14:00-14:30 | 0.5 | 10 | 5 |

Columns: 751, 752, 753, 754, 755, 756, 757

Fig. 12

Candidate device information 176

| Consumer ID | Device ID | Date | Day of week | Time slot | Control completion |
|---|---|---|---|---|---|
| 001 | 101 | 20130814 | Wed | 14:00-14:30 | Pending |
| 001 | 102 | 20130814 | Wed | 14:00-14:30 | Pending |
| 002 | 201 | 20130814 | Wed | 14:00-14:30 | Pending |

Columns: 761, 762, 763, 764, 765, 766

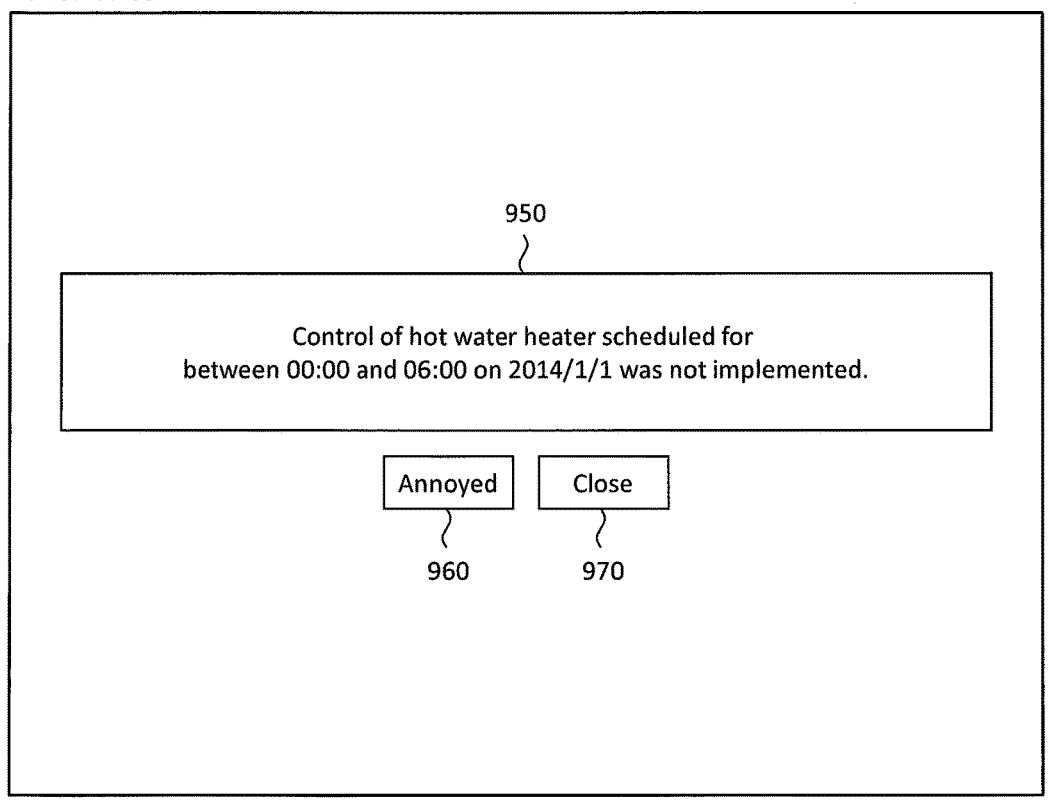

SYSTEM, METHOD AND APPARATUS FOR POWER DEMAND ADJUSTMENT BASED ON CONSUMER ANNOYANCE

CROSS-REFERENCE TO PRIOR APPLICATION

This application relates to and claims the benefit of priority from Japanese Patent Application number 2014-026279, filed on Feb. 14, 2014, the entire disclosure of which is incorporated herein by reference.

BACKGROUND OF THE INVENTION

Field of the Invention

The present invention relates to technology for adjusting demand for power.

Background Art

Direct load control (DLC), which reduces power demand by directly controlling a load when the power supply is tight, is known.

PTL 1 discloses a power usage status monitoring system that is capable of ascertaining a user's power usage status and starting a power supply and/or stopping a power supply without dispatching a worker to the power supply destination.

PTL 2 discloses a load selection/interruption apparatus for selecting and interrupting loads in ascending order of a priority when the power being used exceeds the power that is available.

CITATION LIST

Patent Literature

Japanese Patent Application Laid-open No. 2010-256098
Japanese Patent Application Laid-open No. 2008-125295

Even when a consumer has approved load control beforehand, the results of the load control may give rise to a sense of annoyance. There are cases where this kind of annoyance hinders the widespread use of load control systems, and/or results in consumers withdrawing from the system.

SUMMARY

To resolve the above problems, a power demand adjustment system according to one aspect of the present invention, includes a control apparatus and a processing apparatus. The control apparatus measures a demand of electricity of a device associated the control apparatus in a plurality of devices that receive a supply from a power grid as measurement information, sends the measurement information, and reduces the demand of the associated device by controlling a load of the associated device in response to the command. The processing apparatus stores an evaluation value for each of the plurality of devices, receives, prior to a predetermined plan period, first demand information that includes the measurement information for each of the plurality of devices, and first supply information that indicates a supply from the power grid, predicts a first demand amount which is an amount of demand from the plurality of devices in the plan period on the basis of the first demand information, predicts a first supply amount which is an amount of supply to the plurality of devices in the plan period on the basis of the first supply information, selects, on the basis of the first demand amount, the first supply amount, and the evaluation value, a candidate group, which is a candidate of a target of a load control, from among the plurality of devices, sends, to a communication destination corresponding to the candidate group, confirmation information that indicates a confirmation of the load control, upon receiving refusal information that indicates the load control is refused, excludes a device corresponding to the refusal information from the candidate group, after the selection of the candidate group, receives second demand information that includes the measurement information for each of the plurality of devices, and second supply information that indicates a supply from the power grid, predicts a second demand amount which is an amount of demand from the plurality of devices in the plan period on the basis of the second demand information, predicts a second supply amount which is an amount of supply to the plurality of devices in the plan period on the basis of the second supply information, selects, on the basis of the second demand amount, the second supply amount, and the evaluation value, a target group, which is a target of the load control, from among the candidate group, and sends to the control apparatus corresponding to the target group a command for controlling a load of the target group.

According to one aspect of the present invention, the level of satisfaction of all consumers related to load control can be enhanced.

BRIEF DESCRIPTION OF THE DRAWINGS

FIG. 3 illustrates power supply amount information 161;
FIG. 4 illustrates predicted power supply amount information 162;
FIG. 5 illustrates power demand amount information 163;
FIG. 6 illustrates predicted power demand amount information 164;
FIG. 7 illustrates load measurement value information 171;
FIG. 8 illustrates reduction amount information 172;
FIG. 9 illustrates priority information 173;
FIG. 10 illustrates DLC refusal rate information 174;
FIG. 11 illustrates annoyance level information 175;
FIG. 12 illustrates candidate device information 176;
FIG. 17 illustrates a review screen.

DESCRIPTION OF EMBODIMENT

Examples of the present invention will be explained below using the drawings.

Figure 1:
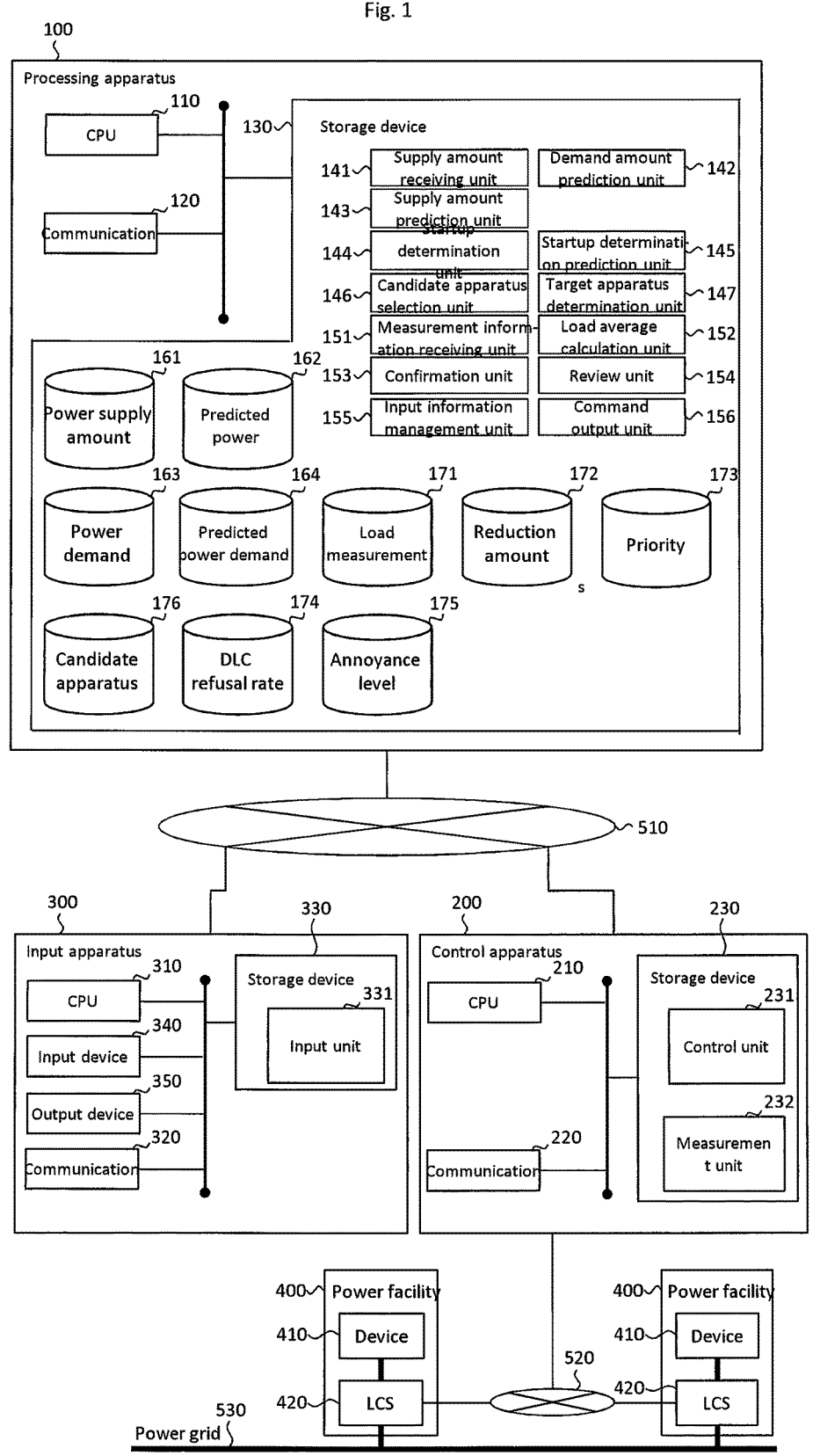
FIG. 1 illustrates a configuration of a power demand adjustment system in an example of the present invention.

FIG. 1 illustrates the configuration of a power demand adjustment system of an example of the present invention.

The power demand adjustment system includes a processing apparatus 100, a control apparatus 200, an input apparatus 300, and a power facility 400. The processing apparatus 100 is installed at an electric power company, a data center, or the like, and the control apparatus 200 and power facility 400 are installed at each of a plurality of consumer facilities. The input apparatus 300 may be installed inside a consumer facility, or may be carried around by the consumer. The processing apparatus 100, the control apparatus 200, and the input apparatus 300 are connected via a communication network 510. The communication network 510 may be a mobile communication network, or a wired communication network. The control apparatus 200 and the power facility 400 are connected via a communication network 520. The communication network 520, for example, utilizes near field communications. The power facility 400 is connected to and receives a supply of power from a power grid 530.

The power grid 530 includes power generation facilities and power transmission facilities. The power generation facilities may include distributed power sources such as wind power generation, solar power generation, and storage batteries.

The processing apparatus 100, for example, is a computer, and includes a central processing unit (CPU) 110, a communication device 120, and a storage device 130. The storage device 130 stores programs and data. The CPU 110 performs the processing of the processing apparatus 100 on the basis of the programs and data stored in the storage device 130. The communication device 120 communicates with the control apparatus 200 and the input apparatus 300 in accordance with an instruction from the CPU 110.

The storage device 130 stores as programs a supply amount receiving unit 141, a demand amount prediction unit 142, a supply amount prediction unit 143, a startup determination unit 144, a startup determination prediction unit 145, a candidate device selection unit 146, a target device determination unit 147, a measurement information receiving unit 151, a load average calculation unit 152, a confirmation unit 153, a review unit 154, an input information management unit 155, and a command output unit 156. In addition, as data, the storage device 130 stores power supply amount information 161, predicted power supply amount information 162, power demand amount information 163, predicted power demand amount information 164, load measurement value information 171, reduction amount information 172, priority information 173, DLC refusal rate information 174, annoyance level information 175, and candidate device information 176. Each unit will be explained in detail below.

The control apparatus 200, for example, is a computer, and includes a CPU 210, a communication device 220, and a storage device 230. The control apparatus 200 may be a home gateway (HGW), a controller for a home energy management system (HEMS), or the like. The storage device 230 stores programs and data. The CPU 210 performs the processing of the control apparatus 200 on the basis of the programs and data stored in the storage device 230. The communication device 220 communicates with the processing apparatus 100 and the input apparatus 300 in accordance with an instruction from the CPU 210.

The storage device 230 stores a control unit 231 and a measurement unit 232 as programs. The control unit 231 receives a command for controlling the demand of the power facility 400 from the processing apparatus 100, and controls the power facility 400 in accordance with the command. The measurement unit 232 sends a request for power measurement information to the power facility 400, and receives measurement information from the power facility 400.

The input apparatus 300, for example, is a computer, and includes a CPU 310, a communication device 320, a storage device 330, an input device 340, and an output device 350. The input apparatus 300 may be a personal computer (PC), an in-home display, a tablet terminal, a portable communication terminal, or the like. The storage device 330 stores a program and data. The CPU 310 performs the processing of the input apparatus 300 on the basis of the program and data stored in the storage device 330. The communication device 320 communicates with the processing apparatus 100 and the control apparatus 200 in accordance with an instruction from the CPU 310.

The control apparatus 200 and the input apparatus 300 may be a single computer.

The storage device 330 stores an input unit 331 as the program. The input unit 331 displays information received from the processing apparatus 100, and sends information that has been inputted by the consumer to the processing apparatus 100.

The power facility 400 includes device 410, and a load control switch (LCS) 420. The device 410 is used by the consumer and consumes power, and is connected to the power grid 530 via the LCS 420. For example, the device 410 is an air conditioner, an electric hot-water heater, or an electric vehicle (EV) charger. The LCS 420 receives an instruction from the control apparatus 200 via the communication network 520, and shuts off the flow of current to the device 410 from the power grid 530 in accordance with the instruction. In addition, the LCS 420, in accordance with the instruction from the control apparatus 200, measures the power being demanded by the device 410, and sends the measurement information to the control apparatus 200 via the communication network 520. Instead of the LCS 420, the device 410 may have power control, power measurement, and communication functions.

The programs stored in the respective computers of the processing apparatus 100, the control apparatus 200, and the input apparatus 300 may be stored in a computer-readable storage medium. In this case, the computer reads a program from the storage medium, and writes the program to the internal storage device.

Figure 2:
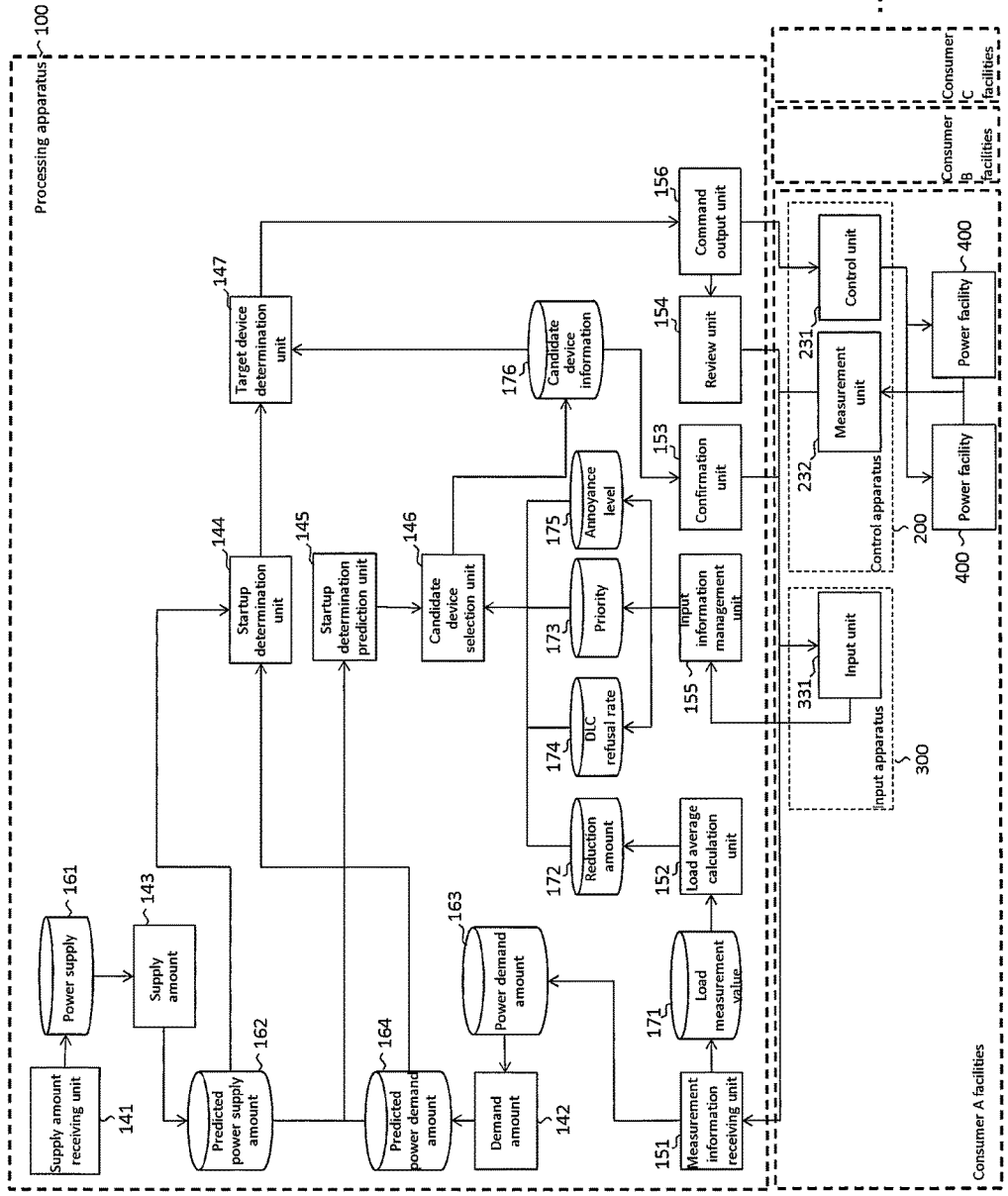
FIG. 2 illustrates a functional configuration of the power demand adjustment system.

FIG. 2 illustrates a functional configuration of the power demand adjustment system.

The control apparatus 200, the input apparatus 300, and the power facility 400 are disposed in each of the consumer facilities. In this drawing, consumer A has consumer A facilities, consumer B has consumer B facilities, and consumer C has consumer C facilities. The relationship between the processing apparatus 100 and the consumer A facilities will be explained below, and this relationship is the same for the consumer B facilities and the consumer C facilities.

In the processing apparatus 100, the supply amount receiving unit 141 receives a power supply amount which is an amount of power supplied to the power grid 530 from any of a system for controlling the power supply and the power generation facilities, and saves the power supply amount to the power supply amount information 161. The supply amount prediction unit 143 receives supply environment information related to a supply environment, and on the basis of the power supply amount information 161 and the supply environment information corresponding to a time window displayed as a day of the week and a time slot, predicts the power supply amount for the relevant time window, and saves the power supply amount to the predicted power supply amount information 162.

In the control apparatus 200, the measurement unit 232 receives measurement information from the LCS 420 by sending a request for measurement information to the LCS 420 at a predetermined measurement time interval, and sends the measurement information to the processing apparatus 100. For example, the measurement time interval is five minutes, and the measurement information is the integral electric energy [Wh] consumed by the device 410.

In the processing apparatus 100, the measurement information receiving unit 151 receives the measurement information from the control apparatus 200, and saves this information to the load measurement value information 171. In addition, the measurement information receiving unit 151 totalizes the load measurement values of all of the devices 410 during the same time slot, and saves this total value to the power demand amount information 163. The demand amount prediction unit 142 receives demand environment information related to a demand environment, and on the basis of the power demand amount information 163 and the demand environment information corresponding to this time slot, predicts the power demand amount which is an amount of power demand for the relevant time window, and saves the predicted power demand amount to the predicted power demand amount information 164. The load average calculation unit 152 calculates the average value of the power demand amount information 163 corresponding to the time window as a reduction amount, and saves the reduction amount to the reduction amount information 172.

In the processing apparatus 100, the startup determination prediction unit 145 determines whether or not additional DLC is needed in the plan period on the basis of the predicted power supply amount information 162 and the predicted power demand amount information 164 corresponding to a time window for a future plan period. When it has been determined that additional DLC is needed in the plan period, the candidate device selection unit 146 selects, from among a plurality of devices being managed in accordance with data in the storage device 130, a candidate device that is a candidate for DLC, excludes from the candidate device the apparatus, for which a refusal was received, from the consumer, and saves the candidate device information 176 indicating the candidate apparatus. The confirmation unit 153 sends a query as to whether or not DLC is to be implemented to the input apparatus 300 corresponding to the selected apparatus.

Thereafter, the supply amount prediction unit 143 updates the predicted power supply amount information 162 on the basis of the new power supply amount information 161 and the supply environment information, and the demand amount prediction unit 142 updates the predicted power demand amount information 164 on the basis of the new power demand amount information 163 and the demand environment information. The startup determination unit 144, on the basis of the updated predicted power supply amount information 162 and predicted power demand amount information 164, once again makes a determination as to whether or not additional DLC is needed in the plan period. When it has been determined that additional DLC is needed in the plan period, the target device determination unit 147 determines the target device that is targeted for DLC from among the candidate apparatus. The command output unit 156 sends a target device DLC command to the control apparatus 200 corresponding to the target apparatus. The review unit 154 sends result information indicating the result of DLC to the input apparatus 300. In the control apparatus 200, the control unit 231 controls the LCS 420 in accordance with the command from the processing apparatus 100.

In the processing apparatus 100, the input information management unit 155 selects and saves the priority information 173, the DLC refusal rate information 174, and the annoyance level information 175 based on the information received from the input apparatus 300.

The data stored in the processing apparatus 100 will be explained below.

FIG. 3 illustrates power supply amount information 161.

The power supply amount information 161 has an entry for each measurement period expressed as a past date and a time slot. A certain measurement period entry includes a date 611 of the relevant measurement period, a day of week 612 of the relevant measurement period, a time slot 613 of the relevant measurement period, and a supply amount 614, which is an electric energy supplied and measured during the relevant measurement period.

FIG. 4 illustrates predicted power supply amount information 162.

The predicted power supply amount information 162 has an entry for each time window expressed as a day of the week and a time slot. A certain time window entry includes a day of the week 621 of the relevant time window, a time slot 622 of the relevant time window, and a supply amount 623, which is the predicted electric energy that is supplied during the relevant time window.

FIG. 5 illustrates power demand amount information 163.

The power demand amount information 163 has an entry for each measurement period expressed as a past date and a time slot. A certain measurement period entry includes a date 631 of the relevant measurement period, a day of week 632 of the relevant measurement period, a time slot 633 of the relevant measurement period, and a demand amount 634, which is an electric energy demanded and measured during the relevant measurement period.

FIG. 6 illustrates predicted power demand amount information 164.

The predicted power demand amount information 164 has an entry for each time window expressed as a day of the week and a time slot. A certain time window entry includes a day of the week 641 of the relevant time window, a time slot 642 of the relevant time window, and a demand amount 643, which is the predicted electric energy that is demanded during the relevant time window.

FIG. 7 illustrates load measurement value information 171.

The load measurement value information 171 has an entry for each combination of a device 410 and a measurement time. An entry corresponding to a certain device 410 and a certain measurement time includes a consumer ID 711 indicating the consumer that possesses the relevant apparatus, a device ID 712 indicating the relevant apparatus, the date 713 of the relevant measurement time, the day of the week 714 of the relevant measurement time, the time 715 of the relevant measurement time, and a measurement value 716, which is the demand power of the relevant device measured at the relevant measurement time.

FIG. 8 illustrates reduction amount information 172.

The reduction amount information 172 has an entry for each combination of a device 410 and a time window. An entry corresponding to a certain device 410 and a certain time window includes a consumer ID 721 indicating the consumer that possesses the relevant apparatus, a device ID 722 indicating the relevant apparatus, the day of the week 723 of the relevant time window, the time slot 724 of the relevant time window, and a reduction amount 725, which is an average value of the past demand power of the relevant device corresponding to the relevant time window. The reduction amount is used as a prediction value for the demand power that is reduced when the relevant device is stopped during the relevant time window.

The power supply amount information 161, the predicted power supply amount information 162, the power demand amount information 163, and the predicted power demand amount information 164 may indicate an electric power [W] instead of an electric energy [Wh]. Also, the load measurement value information 171 and the reduction amount information 172 may indicate an electric power [W] instead of an electric energy [Wh].

FIG. 9 illustrates priority information 173.

The priority information 173 has an entry for each combination of a device 410 and a time window. An entry corresponding to a certain device 410 and a certain time window includes a consumer ID 731 indicating the consumer that possesses the relevant apparatus, a device ID 732 indicating the relevant apparatus, a day of the week 733 of the relevant time window, a time slot 734 of the relevant time window, and a priority 735, which is configured for the relevant device and the relevant time window. For example, the priority is expressed in six stages: 0, 1, 2, 3, 4, 5, and when the priority is 0, the relevant device is not the target of DLC. In addition, the priority information 173 may also have a date specified by the consumer. The priority corresponding to the specified date has a higher priority than a priority that does not correspond to the specified date.

FIG. 10 illustrates DLC refusal rate information 174.

The DLC refusal rate information 174 has an entry for each combination of a device 410 and a time window. An entry corresponding to a certain device 410 and a certain time window includes a consumer ID 741 indicating the consumer that possesses the relevant apparatus, a device ID 742 indicating the relevant apparatus, a day of the week 743 of the relevant time window, a time slot 744 of the relevant time window, a DLC refusal rate 745 for DLC for the relevant device during the relevant time window, a number of confirmations 746 for DLC for the relevant device during the relevant time window, and a number of refusals 747 for DLC for the relevant device during the relevant time window. The refusal rate 745 is a value obtained by dividing the number of refusals 747 by the number of confirmations 746. A value based on the number of refusals 747 may be used instead of the refusal rate 745.

FIG. 11 illustrates annoyance level information 175.

The annoyance level information 175 has an entry for each combination of a device 410 and a time window. An entry corresponding to a certain device 410 and a certain time window includes a consumer ID 751 indicating the consumer that possesses the relevant apparatus, a device ID 752 indicating the relevant apparatus, a day of the week 753 of the relevant time window, a time slot 754 of the relevant time window, a DLC annoyance level 755 for the relevant device during the relevant time window, a number of reviews 756 related to DLC for the relevant device during the relevant time window, and a number of annoyance responses 757 to the reviews related to the DLC for the relevant device during the relevant time window. The annoyance level 755 is a value obtained by dividing the number of annoyance responses 757 by the number of reviews 756. Also, a value based on the number of annoyance responses 757, or a value indicating the extent of the annoyance level may be used instead of the annoyance level 755.

Storing each of the reduction amount, the priority, the DLC refusal rate, and the annoyance level for each time window makes it possible to select the appropriate device for a plan period time window.

FIG. 12 illustrates candidate device information 176.

The candidate device information 176 has an entry for each combination of a candidate device, which is a device selected by the candidate device selection unit 146, and a plan period, which is a period for implementing DLC. An entry corresponding to a certain candidate device and a certain plan period includes a consumer ID 761 indicating the consumer that possesses the relevant candidate device, a device ID 762 indicating the relevant candidate device, a date 763 of the relevant plan period, a day of the week 764 of the relevant plan period, a time slot 765 of the relevant plan period, and control completion information 766 indicating whether or not DLC was implemented for the relevant candidate device in the relevant plan period. The control completion information 766, for example, has a value of either "completed" or "pending".

The operations of the power demand adjustment system will be explained below.

Figure 13:
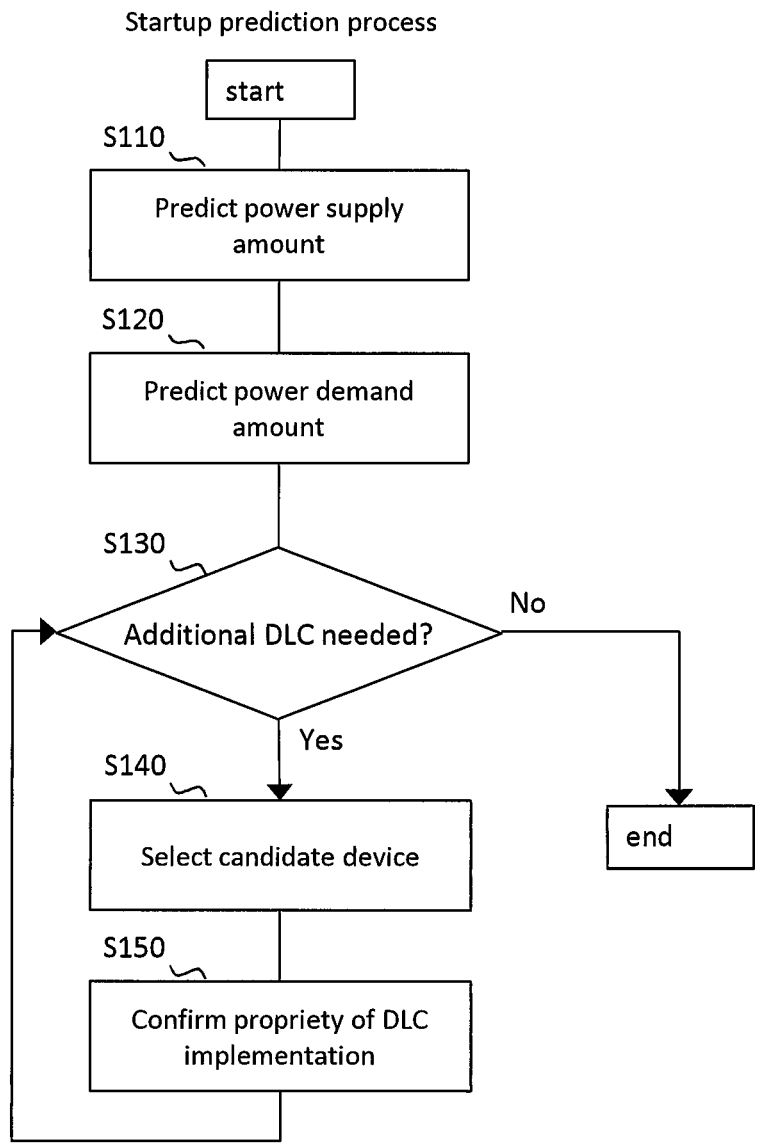
FIG. 13 illustrates a startup prediction process.

FIG. 13 illustrates a startup prediction process.

The startup determination prediction unit 145 executes a startup prediction process on a regular basis. For example, the startup determination prediction unit 145 once a day in the middle of the night determines each of a plurality of time windows for the next day as plan periods, and executes a startup prediction process for each plan period.

In S110, the supply amount prediction unit 143 receives, from outside, supply environment information that will affect the amount of power supplied in the plan period. For example, when the power grid 530 includes a wind power generation facility, the supply environment information will include a prediction value for wind conditions in the plan period. For example, when the power grid 530 includes a solar power generation facility, the supply environment information will include a prediction value for solar radiation in the plan period. In addition, the supply amount prediction unit 143, on the basis of a supply amount 614 corresponding to the plan period time window in the power supply amount information 161 and the supply environment information for the plan period, predicts the amount of power to be supplied in the plan period as the predicted power supply amount, and saves the predicted power supply amount to the supply amount 623 corresponding to the relevant time window in the predicted power supply amount information 162.

Thereafter, in S120, the demand amount prediction unit 142 receives, from outside, demand environment information that will affect the power demand amount in the plan period. For example, the demand environment information includes prediction values for the temperature and humidity for the plan period. In addition, the demand amount prediction unit 142, on the basis of a demand amount 634 corresponding to the plan period time window in the power demand amount information 163 and the demand environment information for the plan period, predicts the power demand amount for the plan period as the predicted power demand amount, and saves the predicted power demand amount to the demand amount 634 corresponding to the relevant time window in the predicted power demand amount information 164.

Thereafter, in S130, the startup determination prediction unit 145 determines whether or not additional DLC is needed in the plan period by comparing the predicted power supply amount and the predicted power demand amount for the plan period. For example, the startup determination prediction unit 145 calculates a value obtained by dividing the predicted power demand amount by the predicted power supply amount as a usage rate, and when the usage rate exceeds a first usage rate threshold, determines that additional DLC is needed. The first usage rate threshold is less than 1, and for example, is 0.8. The startup determination prediction unit 145 may calculate a reserve rate, which is (predicted power supply amount—predicted power demand amount)/predicted power supply amount, instead of the usage rate, and when the reserve rate falls below a predetermined threshold, may determine that additional DLC is needed.

When the candidate device has already been selected at this point, the startup determination prediction unit 145 calculates the predicted power demand amount when DLC has been implemented for the candidate device by subtracting the reduction amount 725 corresponding to the relevant time window and the candidate device in the reduction amount information 172 from the predicted power demand amount.

In S130, when it has been determined that there is no need for additional DLC (No), the startup determination prediction unit 145 ends this flow.

In S130, when it has been determined that there is a need for additional DLC (Yes), in S140, the candidate device selection unit 146 determines the selection precedence for each device on the basis of the reduction amount information 172, the priority information 173, the DLC refusal rate information 174, and the annoyance level information 175 corresponding to the time window and the device for the plan period, adds, in accordance with the selection precedence, the device 410, which is the DLC-target candidate, to the candidate device, and saves the entry indicating the candidate device and the plan period to the candidate device information 176. The control completion information 766 for the relevant entry indicates "pending" at this time.

The candidate device selection unit 146 determines the selection precedence here on the basis of the reduction amount, the priority, the DLC refusal rate, and the annoyance level corresponding to the time window and the device for the plan period. The candidate device selection unit 146 selects device in the descending order of the selection precedence as a candidate device until there is no longer a need for additional DLC. For example, the candidate device selection unit 146 raises the selection precedence of a device as a reduction amount 725 corresponding to the device and the relevant time window in the reduction amount information 172 becomes larger. The candidate device selection unit 146 also raises the selection precedence of a device as a priority 735 of the device corresponding to the device and the relevant time window in the priority information 173 becomes higher. The candidate device selection unit 146 also raises the selection precedence of a device as a DLC refusal rate 745 corresponding to the device and the relevant time window in the DLC refusal rate information 174 becomes lower. In addition, the candidate device selection unit 146 raises the selection precedence of a device as an annoyance level 755 corresponding to the device and the relevant time window in the annoyance level information 175 becomes lower.

At this point, the candidate device selection unit 146 may regard each of the reduction amount, the priority, the DLC refusal rate, and the annoyance level as an evaluation value, may select one of the plurality of evaluation values in accordance with a predetermined sequence, and may determine the selection precedence by sorting the device in accordance with the evaluation value corresponding to the plan period time window. For device for which there is no difference between the evaluation values, the candidate device selection unit 146 determines the selection precedence by selecting and sorting the next sequence of evaluation values. The processing apparatus 100 may not use any of the reduction amount, the priority, the DLC refusal rate, or the annoyance level.

In addition, the candidate device selection unit 146 may use the weight of each predetermined evaluation value, may calculate a score by adding in a weighted manner each evaluation value corresponding to the time window and the device for the plan period, and may determine the selection precedence by sorting the device by score. The candidate device selection unit 146 may also perform sorting after adding a random value to either the evaluation value or the score, and may select the candidate device randomly from among the plurality of devices having the same selection precedence as one another.

Thereafter, in S150, the confirmation unit 153 sends the consumer input apparatus 300 corresponding to the candidate device confirmation information indicating a query as to the propriety of implementing DLC for the candidate device for each candidate device. The query may designate a response deadline. The input information management unit 155 increases the number of confirmations 746 corresponding to the candidate device and the plan period time window in the DLC refusal rate information 174. In the input apparatus 300, the input unit 331 receives the confirmation information, and displays a confirmation screen on the output device 350. When, in accordance with the display of the confirmation screen, the consumer inputs a refusal for the relevant DLC into the input device 340, the input unit 331 sends the refusal information to the processing apparatus 100. The confirmation information and refusal information may be e-mail messages.

Thereafter, when the input information management unit 155 has received refusal information by the response deadline, the confirmation unit 153 determines that the relevant DLC has been refused. In this case, the input information management unit 155 increases the number of refusals 747 corresponding to the device and the plan period time window that correspond to the refusal information in the DLC refusal rate information 174, and excludes the relative device from the candidate device by deleting the relevant device entry from the candidate device information 176. When the input information management unit 155 has not received refusal information by the response deadline, the confirmation unit 153 determines that the relevant DLC has been accepted. A case in which the consumer does not send refusal information by the response deadline is regarded as acceptance of the DLC, and the consumer is notified of this fact beforehand via the contract and so forth. Thereafter, the input information management unit 155 calculates the refusal rate 745 corresponding to the relevant candidate device and plan period time window, and saves the refusal rate 745 to the DLC refusal rate information 174. Thereafter, the confirmation unit 153, upon having determined the results of the reviews of all of the candidate devices, moves the processing to S120.

The processing of S130 through S150 hereinabove is repeated until it is determined in S130 that additional DLC is not needed (No).

According to the startup prediction process above, it is possible to select a device to be a DLC-target candidate. The consumer can also refuse DLC. This makes it possible to use the refusal rate in the selection of a candidate.

Figure 14:
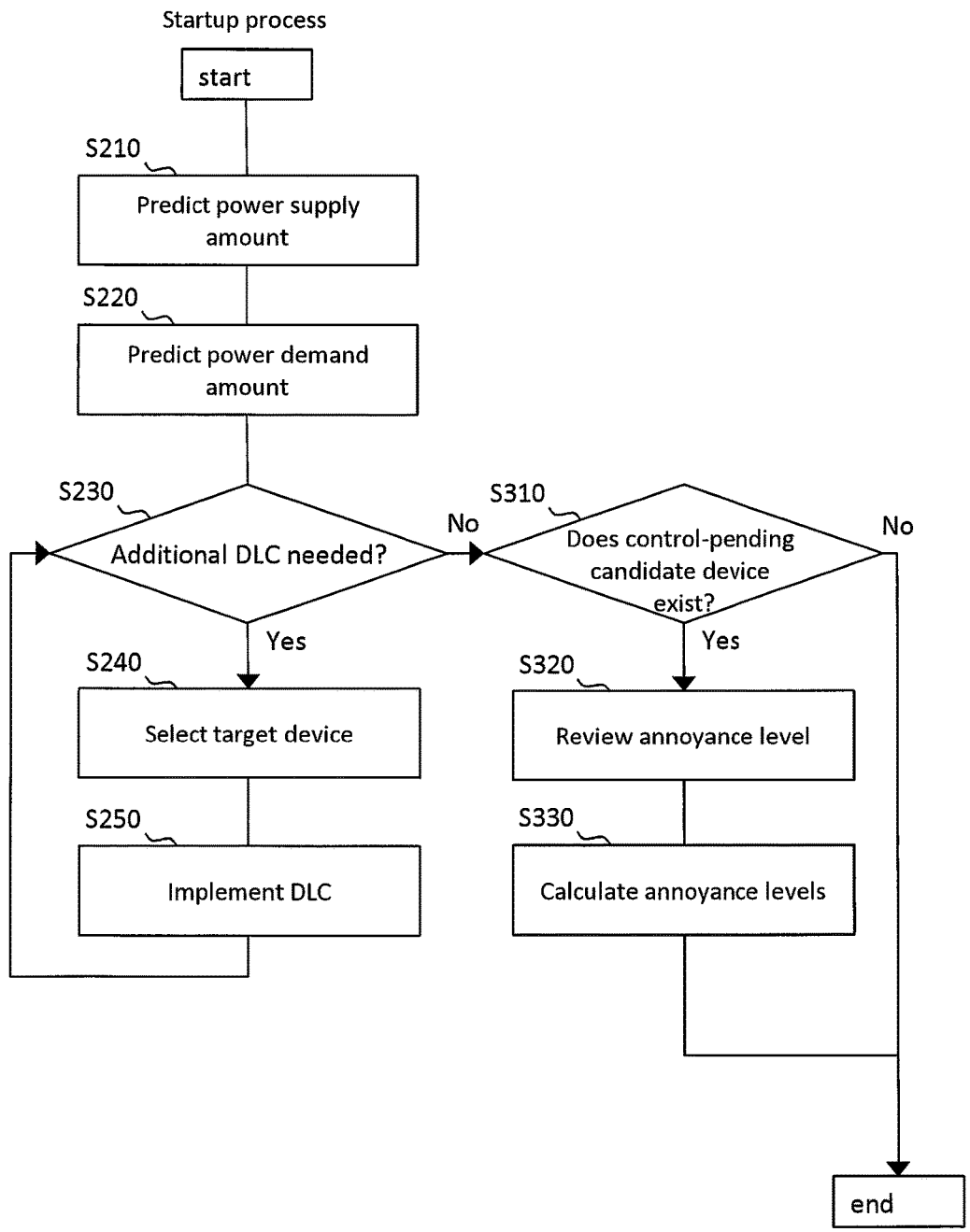
FIG. 14 illustrates a startup process.

FIG. 14 illustrates a startup process.

After the startup prediction process, the startup determination unit 144 executes a startup process prior to the plan period. For example, the startup determination unit 144 executes the startup process at a time that is earlier by a prescribed preparation time than the start of the plan period. The startup determination unit 144 may also execute the startup process in the plan period. The startup determination unit 144 may also execute the startup process when an emergency demand adjustment is necessary, such as when the power supply amount is tight.

In S210, the supply amount prediction unit 143 calculates and saves the predicted power supply amount for the plan period the same as in S110. Thereafter, in S220, the demand amount prediction unit 142 calculates and saves the predicted power demand amount the same as in S120. In the startup process, it is possible to calculate a more accurate predicted power supply amount and predicted power demand amount than the startup prediction process by calculating the predicted power supply amount and the predicted power demand amount on the basis of time information that is closer to the plan period than that of the startup predication process. In S210, the supply amount prediction unit 143 may regard the latest power supply amount result as the predicted power supply amount for the plan period. Also, in S220, the demand amount prediction unit 142 may regard the latest power demand amount result as the predicted power demand amount for the plan period.

Thereafter, in S230, the startup determination unit 144 determines whether or not additional DLC is needed in the plan period by comparing the predicted power supply amount and the predicted power demand amount for the plan period. For example, the startup determination unit 144 calculates a usage rate, and when the usage rate exceeds a second usage rate threshold, determines that additional DLC is needed. The second usage rate threshold is more than the first usage rate threshold but less than 1, and for example is 0.95. The startup determination unit 144 may calculate a reserve rate instead of the usage rate, and when the reserve rate falls below a predetermined threshold, may determine that additional DLC is needed.

When the target device has already been selected at this point, the startup determination unit 144 calculates the predicted power demand amount when DLC has been implemented for the target device by subtracting the reduction amount 725 corresponding to the relevant time window and candidate device in the reduction amount information 172 from the predicted amount of power demand.

In S230, when it has been determined that there is a need for additional DLC (Yes), in S240, the target device determination unit 147 determines the selection precedence for each candidate device on the basis of the reduction amount information 172, the priority information 173, and the annoyance level information 175 corresponding to the time window and the candidate device for the plan period, and selects, in accordance with the selection precedence, the device 410 that is to be targeted for DLC as the target device. The target device determination unit 147 determines the selection precedence here the same as the candidate device selection unit 146, but does not use the DLC refusal rate information 174.

Thereafter, in S250, the command output unit 156 implements DLC by sending a DLC command for the target device to the control apparatus 200 corresponding to the target device. In the control apparatus 200, the control unit 231 receives the command and controls an LCS 420 of the target device in accordance with the command. The LCS 420 shuts off the flow of current from the power grid 530 to the target device. In the control apparatus 200, the control unit 231 sends the control result to the processing apparatus 100.

Thereafter, in S250, the command output unit 156 receives the control result from the control apparatus 200, changes the control completion information 766 corresponding to the target device to "completed" in the candidate device information 176, and moves the processing to S230.

The processing of S230 through S250 above is repeated until it is determined in S230 that additional DLC is not needed (No).

In S230, when it has been determined that additional DLC is not needed (No), in S310, the review unit 154 determines whether or not a control-pending candidate device exists among the candidate apparatus corresponding to the plan period time slot in the candidate apparatus information 176. The control-pending candidate device is a candidate device for which the control completion information 766 of the candidate device information 176 is "pending", that is, a candidate device that has not been selected as a target device.

In S310, when it has been determined that a control-pending candidate device does not exist (No), the review unit 154 ends the flow.

In S310, when it has been determined that a control-pending candidate device exists (Yes), in S320, the review unit 154 sends result information indicating the control-pending candidate device to the consumer corresponding to the relevant candidate device. The input information management unit 155 increases the number of reviews 756 corresponding to the relevant candidate device and the plan period time window in the annoyance level information 175. In the input apparatus 300, the input unit 331 displays a review screen on the output device 350 on the basis of the result information. When information indicating that the consumer is displeased is input to the input device 340 in accordance with the review screen display, the input unit 331 sends annoyance information to the processing apparatus 100. For example, in a case where the consumer has agreed beforehand to DLC for the air conditioner, and DLC was not implemented despite the fact that the consumer went out because the air conditioner would not be operating, the consumer is going to feel annoyed. The result information and annoyance information may be in the form of an e-mail message.

Thereafter, in S330, the input information management unit 155, upon receiving the annoyance information, increases the number of annoyance responses 757 corresponding to the relevant candidate device and the plan period time window in the annoyance level information 175. The input information management unit 155 calculates the annoyance level 755 for the relevant candidate device and the plan period time window, saves this annoyance level 755 in the annoyance level information 175, and ends the flow.

In the startup process, a device other than the candidate device may be selected as a target device when it is determined that yet additional DLC is needed even though all of the candidate devices has been selected as a target device. In the example, the review unit 154 may send the result information to all of the candidate devices, or may send the result information to all of the devices that have been selected as any of a candidate device and a target device.

According to the above startup process, a device that is to be the target of DLC can be selected from among the candidates. Also, consumer discontent due to DLC not being performed despite the fact that the consumer had agreed to DLC can be reviewed. By configuring the second usage rate threshold higher than the first usage rate threshold, it is possible to increase the likelihood of the number of the candidate devices being larger that the number of target devices, and to prevent the number of target devices from exceeding the number candidate devices.

Figure 15:
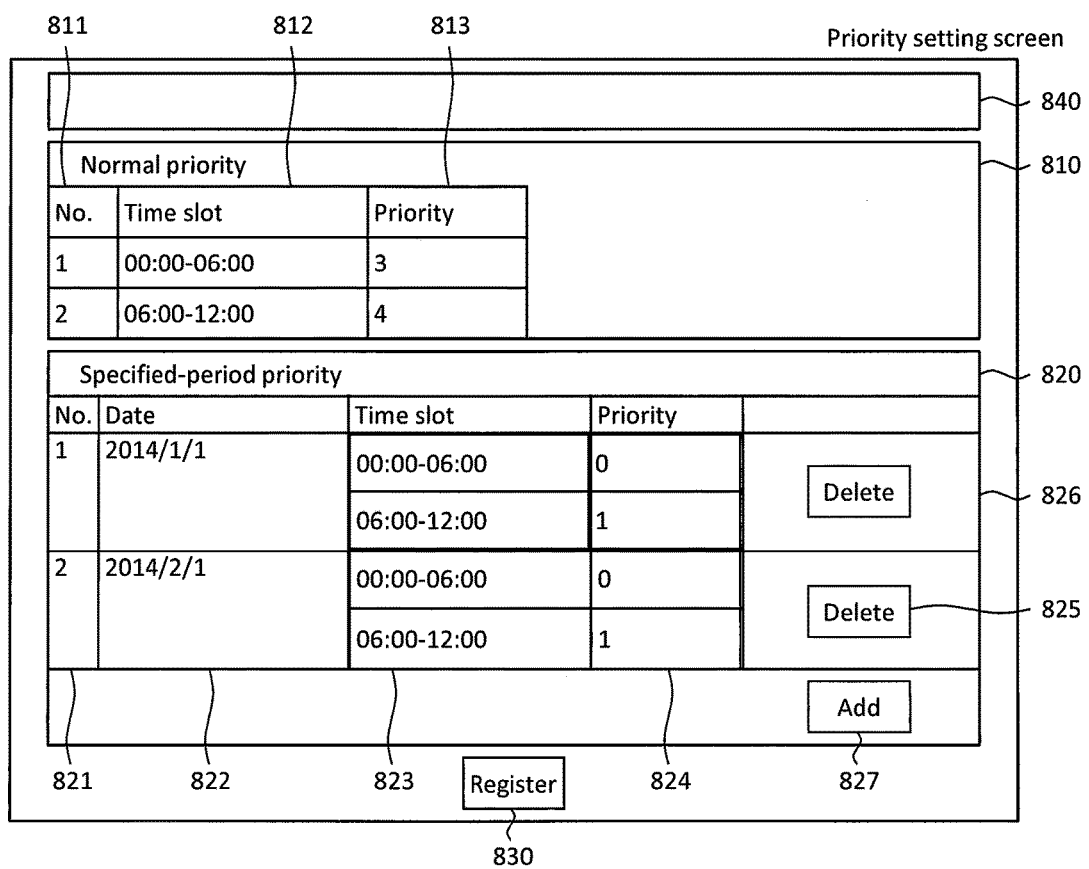
FIG. 15 illustrates a priority setting screen.

FIG. 15 illustrates a priority setting screen.

In the input apparatus 300, the input unit 331 sends the processing apparatus 100 a priority setting request for a device 410 of the relevant consumer in accordance with an input device 340 operation by the consumer. In the processing apparatus 100, the input information management unit 155 sends the input apparatus 300 priority setting screen information in accordance with the priority setting request.

In the input apparatus 300, the input unit 331 displays a priority setting screen on the output device 350 on the basis of the priority setting screen information. For example, the input information management unit 155 uses a Web application to provide the priority setting screen to the input apparatus 300.

The priority setting screen includes a normal setting unit 810, a specified period setting unit 820, a registration button 830, and a message display unit 840. The normal setting unit 810 is an input field for inputting a normal priority, which is the priority for each normal time slot. The specified period setting unit 820 is an input field for inputting a specified-period priority, which is the priority for the relevant device in a specified period. The candidate device selection unit 146 and the target device determination unit 147 use the normal priority when the plan period does not include a specified period, and use the specified-period priority when the plan period includes a specified period. When the registration button 830 is pressed, the input unit 331 sends the processing apparatus 100 the information that was inputted to the normal setting unit 810 and the specified period setting unit 820. The input information management unit 155 receives the information, and reflects the information in the priority information 173. The message display unit 840 displays an inputted information error or the like.

The normal setting unit 810 has an entry for each time slot. Each entry includes a number 811, a time slot input unit 812, and a priority input unit 813. The number 811 is the number of the relevant entry. In the time slot input unit 812, the end time of the previous time slot is displayed at the start time of the time slot being specified, and the end time of the time slot being specified is inputted. In the priority input unit 813, the priority of the relevant device in the relevant time slot is inputted. This makes it possible for the consumer to configure a time window for a normal time and a priority corresponding to the device. As the default, for example, the median of a range of priorities is configured as the normal priority.

The specified period setting unit 820 includes an entry 826 for each specified-period date and an add button 827. When the add button 827 is pressed, the specified period setting unit 820 adds a new entry 826. Each entry 826 includes a number 821, a date input unit 822, a time slot input unit 823, a priority input unit 824, and a delete button 825. The number 821 is the number of the relevant entry. In the date input unit 822, a specified-period date is input. In the time slot input unit 823, the end time of the previous time slot is displayed at the start time of the specified-period time slot, and the end time of the specified-period time slot is inputted. In the priority input unit 824, the priority of the relevant device in the relevant specified time is inputted. When the delete button 825 is pressed, the specified period setting unit 820 deletes the corresponding entry 826. This makes it possible for the consumer to configure a priority that corresponds to the specified period and the device.

According to the priority setting screen, the consumer is able to specify a date and time, and to configure a priority in addition to the normal priority setting. The consumer is also able to exclude a specific device from the DLC targets in a specific time slot. For example, the priority for a specific device is configured high for a specific day of the week because the consumer works on that day and is not at home, but when the consumer stays home from work on that day, the consumer is able to exclude the specific device from the DLC targets for that day by performing a specified date setting.

In addition, the input unit 331 may display a registration screen on the output device 350 in order to register a device 410 of the relevant consumer in accordance with an input device 340 operation by the consumer.

Figure 16:
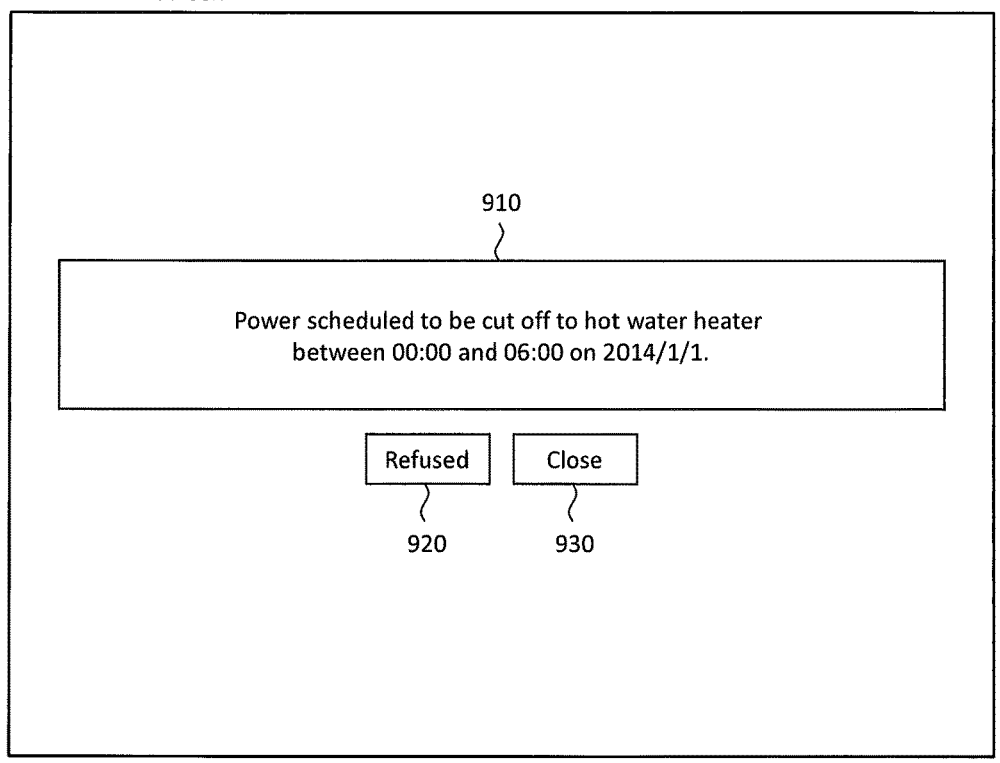
FIG. 16 illustrates a confirmation screen.

FIG. 16 illustrates a confirmation screen.

As described hereinabove, the confirmation screen is displayed on the output device 350 of the input apparatus 300 in the startup prediction process.

The confirmation screen includes a screen display unit 910, a refusal button 920, and an end button 930. The screen display unit 910 indicates the plan period date and time slot, and the candidate device. When the refusal button 920 is pressed in accordance with an input device 340 operation by the consumer, the input unit 331 sends refusal information to the processing apparatus 100. When the consumer has a plurality of candidate devices, the confirmation screen includes a list of the plurality of candidate devices in order to allow the consumer to select the candidate device for which DLC is to be refused. When the end button 930 is pressed, the input unit 331 closes the confirmation screen.

According to the confirmation screen, the consumer is able to learn the DLC plan beforehand, and to refuse the DLC.

FIG. 17 illustrates a review screen.

As described hereinabove, the review screen is displayed on the output device 350 of the input apparatus 300 in the startup process.

The review screen has a results display unit 950, an annoyance button 960, and an end button 970. The results display unit 950 indicates the plan period date and time slot, the candidate device, and the fact that DLC was not implemented. When the annoyance button 960 is pressed in accordance with an input device 340 operation by the consumer, the input unit 331 sends annoyance information to the processing apparatus 100. When the end button 970 is pressed, the input unit 331 closes the review screen.

According to the review screen, the processing apparatus 100 is able to receive annoyance information indicating that the consumer felt annoyed by the DLC results, and is able to use the annoyance information thereafter to select a DLC target. In particular, the processing apparatus 100 is able to receive annoyance information when the consumer feels annoyed that DLC was not implemented despite the fact that the consumer had agreed to the DLC.

The effects of the example will be explained.

In accordance with giving priority to the selection of low annoyance level device as any of a candidate device and a target device, a device of a consumer for which the annoyance level tends to be high can become difficult to select as a candidate device, making it possible to prevent the consumer annoyance level from rising. In accordance with giving priority to the selection of a low DLC refusal rate device as a candidate device, it becomes difficult to select a refusal-susceptible device as a candidate device, making it possible to hold down the probability of DLC being refused, to suppress the time it takes to ensure a demand adjustment amount which is an amount of demand adjustment required by the startup prediction process, and to increase the likelihood of ensuring the required demand adjustment amount within a fixed period of time. In accordance with using a normal priority configured by the consumer and a specified-day priority configured by the consumer, and selecting any of a candidate device and a target device by using the specified-day priority when the plan period is a specified day, it is possible to more finely reflect the wishes of the consumer, and to enhance customer satisfaction for the power demand adjustment system. In accordance with giving priority to the selection of a device having a high pre-calculated reduction amount as any of a candidate device and a target device, it is possible to reduce the time it takes to ensure the demand adjustment amount needed by the startup prediction process.

In addition, when the power grid 530 includes a large number of renewable energy-based power facilities, it is difficult to control the power supply amount, and there are big fluctuations in the power supply amount. According to this example, even when it is difficult to control the power supply amount and there are big fluctuations in the power supply amount, it is possible to adjust the power demand amount in accordance with the power supply amount by directly controlling the device, and to increase the likelihood of ensuring the required demand adjustment amount within a fixed period of time.

Also, even when executing DLC is permitted in accordance with the contract, the consumer is able to refuse DLC beforehand for each device, thereby making it possible to enhance customer satisfaction for the power demand adjustment system more than when refusal is not an option. It is also possible to enhance customer satisfaction for the power demand adjustment system by reviewing cases in which the consumer felt annoyed and avoiding operations that give rise to annoyance. Enhancing customer satisfaction in these ways will enable the widespread use of the power demand adjustment system to be promoted, and will make it possible to prevent customers from withdrawing from the power demand adjustment system.

The terminology used to describe the present invention will be explained. A processing apparatus and a power demand adjustment apparatus correspond to the processing apparatus 100 or the like. A control apparatus corresponds to the control apparatus 200 or the like. An input apparatus corresponds to the input apparatus 300 or the like. The device corresponds to the device 410 or the like. A storage unit corresponds to the storage device 130 or the like. A processing unit corresponds to the CPU 110 or the like. First demand information and second demand information correspond to the measurement information and the demand environment information or the like. First supply information and second supply information correspond to the power supply amount information 161 and the supply environment information or the like. A first demand amount and a second demand amount correspond to the predicted power demand amount information 164 or the like. A first supply amount and a second supply amount correspond to the predicted power supply amount information 162 or the like. A candidate group corresponds to the candidate device or the like. A target group corresponds to the target device or the like. A first threshold corresponds to the first usage rate threshold or the like. A second threshold corresponds to the second usage rate threshold or the like. A communication destination corresponds to the input apparatus 300 and the control apparatus 200, an apparatus that integrates these apparatuses, or the like.

The present invention is not limited to the above example, and can be changed to a variety of other forms without departing from the gist thereof.

What is claimed is:

1. A power demand adjustment system comprising:
   a control apparatus that measures a demand of electricity of a device associated with the control apparatus in a plurality of devices that receive a supply from a power grid as measurement information, sends the measurement information, and reduces the demand of the associated device by controlling a load of the associated device in response to the command; and
   a processing apparatus that stores an evaluation value for each of the plurality of devices, receives, prior to a predetermined plan period, first demand information that includes the measurement information for each of the plurality of devices, and first supply information that indicates a supply from the power grid, predicts a first demand amount which is an amount of demand from the plurality of devices in the plan period on the basis of the first demand information, predicts a first supply amount which is an amount of supply to the plurality of devices in the plan period on the basis of the first supply information, selects, on the basis of the first demand amount, the first supply amount, and the evaluation value, a candidate group, which is a candidate of a target of a load control, from among the plurality of devices, sends, to a communication destination corresponding to the candidate group, confirmation information that indicates a confirmation of the load control, upon receiving refusal information that indicates the load control is refused, excludes a device corresponding to the refusal information from the candidate group, after the selection of the candidate group, receives second demand information that includes the measurement information for each of the plurality of devices, and second supply information that indicates a supply from the power grid, predicts a second demand amount which is an amount of demand from the plurality of devices in the plan period on the basis of the second demand information, predicts a second supply amount which is an amount of supply to the plurality of devices in the plan period on the basis of the second supply information, selects, on the basis of the second demand amount, the second supply amount, and the evaluation value, a target group, which is a target of the load control, from among the candidate group, and sends to the control apparatus corresponding to the target group a command for controlling a load of the target group,
   wherein the processing apparatus, after the plan period, receives annoyance information that indicates a consumer felt annoyed with the load control, and calculates the evaluation value on the basis of the number of pieces of annoyance information corresponding to each of the plurality of devices, and
   wherein the processing apparatus, after the plan period, sends, to a communication destination corresponding to a device in the candidate group, result information that indicates a result of the load control, calculates an annoyance level, which is a rate of the number of pieces of annoyance information relative to the number of pieces of result information corresponding to each of the plurality of devices, determines a selection precedence for each of the plurality of devices under a condition that the selection precedence becomes higher as the annoyance level becomes lower, and selects any of the candidate group and the target group from among the plurality of devices in accordance with the selection precedence.

2. A power demand adjustment system according to claim 1, wherein the processing apparatus determines the candidate group satisfying a condition that a rate of a first demand amount, which is obtained by subtracting a reduction amount resulting from a load control for the candidate group, relative to the first supply amount is equal to or less than a first threshold, and determines the target group satisfying a condition that a second demand amount, which is obtained by subtracting a reduction amount resulting from a load control for the target group, relative to the second supply amount is equal to or less than a second threshold that is higher than the first threshold.

3. A power demand adjustment system according to claim 1, wherein the processing apparatus, after the plan period, sends the result information to a communication destination corresponding to a device that does not belong to the target group among the candidate group.

4. A power demand adjustment system according to claim 3, wherein the processing apparatus calculates a refusal rate, which is a rate of the number of pieces of refusal information relative to the number of pieces of confirmation information corresponding to each of the plurality of devices, determines the selection precedence under a condition that the selection precedence becomes higher as the refusal rate becomes lower, and selects the candidate group from among the plurality of devices in accordance with the selection precedence.

5. A power demand adjustment system according to claim 4, wherein
the evaluation value of each of the plurality of devices includes a predetermined priority, and
the processing apparatus determines the selection precedence under a condition that the selection precedence becomes higher as the priority becomes higher, and selects any of the candidate group and the target group from among the plurality of devices in accordance with the selection precedence.

6. A power demand adjustment system according to claim 5, wherein the processing apparatus stores an evaluation value corresponding to each of the plurality of devices and each of a predetermined plurality of time windows.

7. A power demand adjustment system according to claim 6, wherein the processing apparatus calculates for each of the plurality of devices a demand amount for power in a time window corresponding to the plan period on the basis of the measurement information, determines the selection precedence under a condition that the selection precedence becomes higher as the demand amount becomes larger, and selects any of the candidate group and the target group from among the plurality of devices in accordance with the selection precedence.

8. A power demand adjustment system according to claim 1, comprising an input apparatus that displays a confirmation screen for receiving an input from a consumer in response to the confirmation information, and sends to the processing apparatus the refusal information in response to an input that indicates refusal of the load control.

9. A power demand adjustment system according to claim 8, wherein the input apparatus displays a review screen for receiving an input from a consumer in response to the result information, and sends to the processing apparatus the annoyance information in response to an input that indicates the consumer felt annoyed with the result of the load control.

10. A power demand adjustment system according to claim 9, wherein
the input apparatus displays a priority selection screen for receiving an input from a consumer, and sends to the processing apparatus the priority information in response to an input of a priority information that indicates a specific device, a specific time, and a specific priority, and
the processing apparatus receives and stores the priority information, and when the plan period includes the specific time, determines a selection precedence for the specific device on the basis of the specific priority.

11. A power demand adjustment method comprising:
storing, using a processing apparatus, an evaluation value for each of a plurality of devices that receive a supply of electricity from a power grid;
measuring, using a control apparatus, a demand of electricity of a device associated with the control apparatus in the plurality of devices as measurement information, and sending the measurement information;
prior to a predetermined plan period, receiving, using the processing apparatus, a first demand information that includes the measurement information of each of the plurality of devices, and first supply information that indicates a supply from the power grid;
predicting, using the processing apparatus, a first demand amount which is an amount of demand from the plurality of devices in the plan period on the basis of the first demand information, predicting a first supply amount which is an amount of supply to the plurality of devices in the plan period on the basis of the first supply information, selecting, on the basis of the first demand amount, the first supply amount, and the evaluation value, a candidate group, which is a candidate of a target of a load control, from among the plurality of devices, and sending, to a communication destination corresponding to the candidate group, confirmation information that indicates confirmation of the load control;
upon receiving refusal information that indicates the load control is refused, excluding, using operating the processing apparatus, a device corresponding to the refusal information from the candidate group;
after the selection of the candidate group, receiving, using the processing apparatus, second demand information that includes measurement information for each of the plurality of devices, and second supply information that indicates a supply from the power grid;
predicting, using the processing apparatus, a second demand amount which is an amount of demand from the plurality of devices in the plan period on the basis of the second demand information, predicting a second supply amount which is an amount of supply to the plurality of devices in the plan period on the basis of the second supply information, selecting, on the basis of the second demand amount, the second supply amount, and the evaluation value, a target group, which is a target of the load control, from among the candidate group, and sending to the control apparatus corresponding to the target group a command for controlling a load of the target group; and
reducing, using the control apparatus, the demand of the associated device by controlling a load of the associated device in response to the command,
wherein the processing apparatus, after the plan period, receives annoyance information that indicates a consumer felt annoyed with the load control, and calculates the evaluation value on the basis of the number of pieces of annoyance information corresponding to each of the plurality of devices, and
wherein the processing apparatus, after the plan period, sends, to a communication destination corresponding to a device in the candidate group, result information that indicates a result of the load control, calculates an annoyance level, which is a rate of the number of pieces of annoyance information relative to the number of pieces of result information corresponding to each of the plurality of devices, determines a selection precedence for each of the plurality of devices under a condition that the selection precedence becomes higher as the annoyance level becomes lower, and selects any of the candidate group and the target group from among the plurality of devices in accordance with the selection precedence.

12. A power demand adjustment apparatus comprising:
a storage unit that stores an evaluation value for each of a plurality of devices that receive a supply of electricity from a power grid; and
a processing unit that receives, prior to a predetermined plan period, first demand information that includes measurement information of each of the plurality of devices, and first supply information that indicates a supply from the power grid, predicting a first demand amount which is an amount of demand of the plurality of devices in the plan period on the basis of the first demand information, predicts a first supply amount which is an amount of supply to the plurality of devices in the plan period on the basis of the first supply information, selects, on the basis of the first demand amount, the first supply amount, and the evaluation value, a candidate group, which is a candidate of a target of a load control, from among the plurality of devices, sends, to a communication destination corresponding to the group of candidates, confirmation information that indicates a confirmation of the load control, upon receiving refusal information that indicates the load control is refused, excludes a device corresponding to the refusal information from the candidate group, after the selection of the candidate group, receives second demand information that includes measurement information for each of the plurality of devices, and second supply information that indicates a supply from the power grid, predicts a second demand amount which is an amount of demand from the plurality of devices in the plan period on the basis of the second demand information, predicts a second supply amount which is an amount of supply to the plurality of devices in the plan period on the basis of the second supply information, selects, on the basis of the second demand amount, the second supply amount, and the evaluation value, a target group, which is a target of the load control, from among the candidate group, and sends to a control apparatus corresponding to the target group a command for controlling a load of the target group,
wherein the processing unit, after the plan period, receives annoyance information that indicates a consumer felt annoyed with the load control, and calculates the evaluation value on the basis of the number of pieces of annoyance information corresponding to each of the plurality of devices, and
wherein the processing apparatus, after the plan period, sends, to a communication destination corresponding to a device in the candidate group, result information that indicates a result of the load control, calculates an annoyance level, which is a rate of the number of pieces of annoyance information relative to the number of pieces of result information corresponding to each of the plurality of devices, determines a selection precedence for each of the plurality of devices under a condition that the selection precedence becomes higher as the annoyance level becomes lower, and selects any of the candidate group and the target group from among the plurality of devices in accordance with the selection precedence.

* * * * *